United States Patent [19]
Sheesley et al.

[11] 3,910,165
[45] Oct. 7, 1975

[54] EXTENDED GUIDE-TIE RODS

[76] Inventors: John M. Sheesley, P.O. Box 14604, Houston, Tex. 77021; Ronald A. Gulick, 218 Oyster Creek Dr., Sugarland, Tex. 77478

[22] Filed: Nov. 20, 1972

[21] Appl. No.: 308,263

[52] U.S. Cl. .................................................. 92/165 R
[51] Int. Cl. ...................... F16j 15/18; F16c 17/00
[58] Field of Search ............................ 92/166, 165

[56] References Cited
UNITED STATES PATENTS

| | | | |
|---|---|---|---|
| 11,549 | 8/1854 | Ellis | 92/165 R |
| 2,552,634 | 5/1951 | Kerr | 92/165 R |
| 2,668,656 | 2/1954 | Booth, Jr. et al. | 92/165 R |
| 3,146,684 | 9/1964 | Vanderhoof | 92/165 R |

FOREIGN PATENTS OR APPLICATIONS 324,297  8/1920  Germany ........................... 92/165 R

*Primary Examiner*—Paul E. Maslousky

[57] ABSTRACT

Piston-containing cylinder includes tie rod or rods extending therethrough. Within the pneumatically or hydraulically pressurized cylinder, the piston rides along and is guided by the tie rods. The rod portions can extend without the cylinder, and be fixed and serve as guides for a block which block reciprocates with the piston. This may cause movement of some further member, such as cause the rotation of a yoke, which yoke may be keyed to a valve stem.

4 Claims, 2 Drawing Figures

EXTENDED GUIDE-TIE RODS

BACKGROUND OF THE INVENTION

Actuators have long been used to operate related devices, such as valves. In the case of some valves, for example, the opening and closing of the valve has been controlled by valve stem rotation. This rotation of a valve stem has been governed by actuator means such as shown in U.S. Pat. Nos. 3,104,592 and 3,146,681. Normally a piston-containing cylinder is utilized to provide the motive force. Some prior art actuators have included integral tie rods to rigidify the cylinder and/or to guide piston movement and to absorb side loads. On occasion, it has been desirable for a work function to be performed outside the housing, yet be caused by a reciprocating piston rod. Examples of work functions are exemplified in U.S. Pat. Nos. 788,610; 841,001; 957,920; 1,576,830; 1,966,675; 2,328,918; 2,707,483; and 2,936,737. Whereas the use of wholly separate cylinder structure and outside guide-support structure would, in some areas, perform the necessary work function, the complicated arrangements necessary resulted in unduly high fabrication costs. Also the space available for mounting would, on occasion, limit utilization. It was to this area that applicant directed this invention.

SUMMARY OF THE INVENTION

The invention utilizes, as a starting point, a cylinder containing a piston with piston rod attached. The piston may be actuated in a known manner, as by pressurized fluid or air. The piston rod would extend outwardly of the cylinder housing. The cylinder may include integral tie rods to rigidify said cylinder, which rods may also serve to guide piston movement. Exterior of the cylinder, a guide or guides would extend. These rods would be integral with, or constitute extensions of the cylinder tie rods. The exterior guides would constitute supports for, as well as guides for, a member associated with the reciprocating piston rod, such as a traveling block. Such a member would serve as the connecting link with a to-be-actuated device, such as a crank, yoke or other member. These actuated members could well serve as intermediate actuating mechanisms. Such an example might occur wherein the yoke, in turn would be keyed to a valve stem, which stem could cause opening or closing of a valve when the yoke is rotated by piston rod reciprocation.

DESCRIPTION OF THE INVENTION

A valve housing is generally illustrated at 10. It is to be understood throughout that the describing of a valve as the actuated structure is merely illustrative, and such structure may vary over a wide range of devices, the actuator itself forming the basis for the invention. This valve may have a rotatable stem 11.

Figure 1:
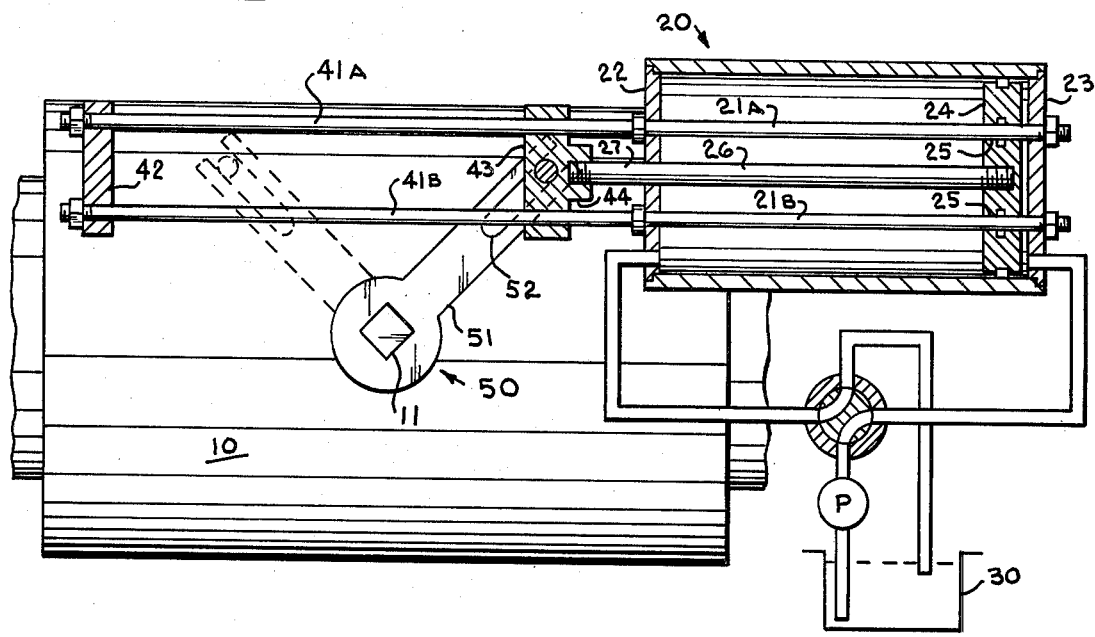
FIG. 1 is a partly schematic vertical section through the invention.

The actuator itself would include a power cylinder 20. Normally pneumatic or hydraulic means would be provided leading from a source, such as reservoir 30, to the cylinder. But, mechanical devices, such as hand driven screws, or the like, may certainly be used as the power source of the invention. A conduit system is illustrated in FIG. 1 to connect the source, through valving, to either side of the power cylinder. Within cylinder 20, a pair of tie rods 21a and 21b are seen to extend therethrough and to have their ends fixed to the exterior of cylinder end plates 22 and 23. Within the cylinder, piston 24 reciprocates and includes means such as apertures 25 for slidingly engaging and being guided by rods 21a and 21b. Thus, such rods serve not only to tie together and unify the power cylinder, but also to guide the piston and to absorb lateral forces exerted by the piston. These features, however, are not claimed to be new herein. The piston 24 is shown to carry one end of a piston rod 26, which rods outer end 27 extends outwardly of the cylinder, and reciprocates along with the piston.

Figure 2:
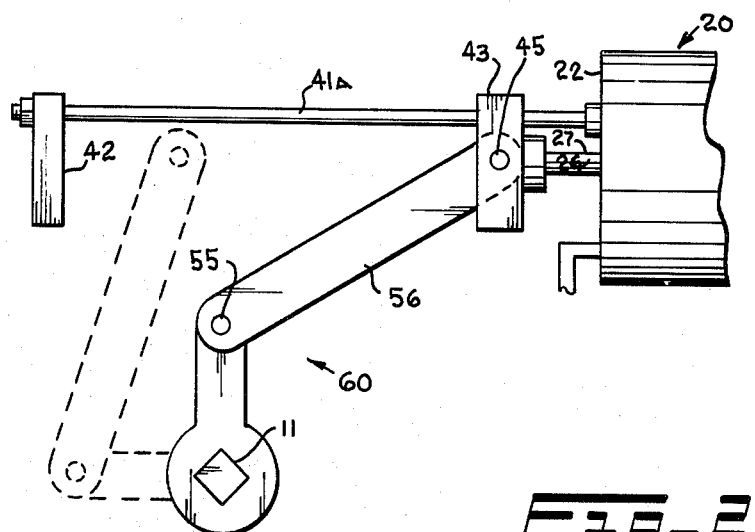
FIG. 2 is a similar view illustrating a different actuated device, as well as a modification of the block-support structure.

Consider, now the structure exterior of the power cylinder. At this point it may be noted that such cylinder and the hereinafter discussed structure may be fixed to or tied down to other equipment, such as to valve 10. The structure exterior of the cylinder may be physically within an integrated structure, such as the central housing of an actuator, or may comprise a portion of a separate device. Support rods 41a and 41b are fixed at one end to cylinder 20. Their other end is shown to be fixed to bracket 42, in a conventional manner. This bracket may be welded or otherwise joined to a valve housing. Slidably positioned on rods 41a and 41b, and guided therealong, is follower 43. This follower may take the form of a traveling block, and be apertured for receiving said rods. End 27 of piston rod 26 may be threadedly engaged or otherwise joined to a lug extension 44 of the block. A pin 45 may extend laterally of follower 43. This pin would be received within slot 52 of the arm 51 of rotatable yoke 50 (see FIG. 1). This yoke may be rotatably fixed to valve 10, and have valve stem 11 keyed therein, as earlier described. In FIG. 2, a similar yoke 60 is shown to be pivotally joined at 55 to link 56. The other end of said link is pivotally joined to pin 45 carried by follower 43. The connection 42 in FIG. 2 could represent a bracket, such as in FIG. 1, or one wall of a central housing for an actuator or other device. Also, only a single support rod 41a may be utilized. Thus, the operation of the two embodiments is similar.

In operation, a source of pressurized fluid provides such fluid in a normal manner to power cylinder 20. (It may be here noted that a plurality of such cylinders may be cooperatively used-it being only necessary to describe one for purposes of this description.) Such fluid would enter the right side of the cylinder as seen in FIG. 1 during the power stroke. Thus, piston 24 would move to the left carrying along piston rod 26. This is conventional. However, one end of such piston rod extends outwardly of the cylinder, to be connected with a follower member, namely block 43. This member performs a work function, in this case rotating a yoke or lever arm. The reciprocatory movement of the follower is guided by members 41a and 41b in FIG. 1, or by 41a above in FIG. 2. It should be noted that the form of these may vary, i.e., they may be simple rods, as well as have such forms as slotted plates. In such a configuration, follower rollers may ride in the slots rather than the follower be apertured. Also, these guides 41 may constitute actual extensions of cylinder guides 21a and 21b. By such means, i.e., members 21a,

*b* and 41 *a, b* being integral, not only do they serve as piston and follower guides, but also serve as tie rods to tie together the cylinder. Thus, although limited embodiments have been described, it should be obvious that numerous modifications would be possible by one skilled in the art without departing from the spirit of the invention, the scope of which is intended to be limited only by the following claims.

We claim:

1. In an actuator having a power driven piston reciprocatingly positioned within a cylinder, and a piston rod linked at one end to said piston with said piston rod's other end extending outside of said cylinder, the improvement comprising: spaced guide rods within said cylinder, and fixed to said cylinder at opposite ends thereof, said piston slidably engaging said guide rods;

a follower device connected to said other end of said piston rod for movement therewith exterior of said cylinder;

at least one follower guide means, exterior of said cylinder and fixed thereto, said follower guide means being a linear extension of at least one of said spaced guide rods;

said follower device including means for slidably engaging said follower guide means; and means associated with said follower device for actuating a further piece of equipment on said follower being caused to move by said piston rod.

2. The actuator of claim 1 wherein said follower guide means comprises a pair of spaced follower guide members, each being linear extensions of one of said spaced guide rods.

3. The actuator of claim 2 wherein said follower guide members and said spaced guide rods are integral.

4. The actuator of claim 2 wherein said piston rod reciprocates intermediate said follower guide members along a line parallel to said follower guide members.

* * * * *